United States Patent
Joergensen et al.

(10) Patent No.: US 8,571,014 B2
(45) Date of Patent: Oct. 29, 2013

(54) DISTRIBUTED PACKET-BASED TIMESTAMP ENGINE

(75) Inventors: Thomas Kirkegaard Joergensen, Soeborg (DK); Brian Branscomb, Hopkinton, MA (US); Kristian Ehlers, Skovlunde (DK)

(73) Assignee: Vitesse Semiconductor Corporation, Camarillo, CA (US)

( * ) Notice: Subject to any disclaimer, the term of this patent is extended or adjusted under 35 U.S.C. 154(b) by 0 days.

(21) Appl. No.: 13/039,199

(22) Filed: Mar. 2, 2011

(65) Prior Publication Data

US 2012/0014377 A1  Jan. 19, 2012

Related U.S. Application Data

(60) Provisional application No. 61/309,803, filed on Mar. 2, 2010.

(51) Int. Cl.
*H04L 12/66* (2006.01)

(52) U.S. Cl.
USPC ........... 370/352; 370/229; 370/350; 370/389; 370/394; 370/509

(58) Field of Classification Search
USPC .............. 370/229, 350, 352, 389, 394, 395.4, 370/474, 509
See application file for complete search history.

(56) References Cited

U.S. PATENT DOCUMENTS

| | | | |
|---|---|---|---|
| 4,736,019 A * | 4/1988 | Bellattar et al. ........... | 530/389.3 |
| 4,894,823 A * | 1/1990 | Adelmann et al. ............ | 370/252 |
| 6,845,100 B1 * | 1/2005 | Rinne ...................... | 370/395.43 |
| 7,215,637 B1 * | 5/2007 | Ferguson et al. .......... | 370/230.1 |
| 7,292,537 B2 * | 11/2007 | Charcranoon ................ | 370/252 |
| 7,656,947 B2 * | 2/2010 | Seo et al. ...................... | 375/240 |
| 7,689,854 B2 | 3/2010 | Ilnicki et al. | |
| 7,747,725 B2 * | 6/2010 | Williams et al. .............. | 709/223 |
| 7,787,438 B2 * | 8/2010 | Dowse .......................... | 370/350 |
| 2002/0024970 A1 * | 2/2002 | Amaral et al. ................ | 370/468 |
| 2002/0027886 A1 | 3/2002 | Fischer et al. | |
| 2002/0085582 A1 * | 7/2002 | Kim .............................. | 370/445 |

(Continued)

OTHER PUBLICATIONS

Eidson et al., (2008). International IEEE Symposium on Precision Clock Synchronization for Measurement, Control and Communication. ISPCS 2008. Spider Transparent Clock. Sep. 22-26, 2008. Ann Arbor, Michigan.

(Continued)

*Primary Examiner* — Andrew Lai
*Assistant Examiner* — Andrew C Lee
(74) *Attorney, Agent, or Firm* — Klein, O'Neill & Singh, LLP

(57) ABSTRACT

A system handles timing information within a packet-switched network. The system classifies packets for processing depending on the packet type. After classification, a new timestamp value may be produced depending on the packet classification. The new timestamp value may use a timestamp value from the received packet, a value from a local clock, and an offset value. The timestamp value may be written into the packet, depending on the packet classification, and checksum-type fields may additionally be updated in the packet. In some embodiments, multiple physical layer circuits are integrated with a local clock circuit.

27 Claims, 5 Drawing Sheets

(56) References Cited

U.S. PATENT DOCUMENTS

| | | | |
|---|---|---|---|
| 2003/0095551 A1* | 5/2003 | Gotoh et al. | 370/395.3 |
| 2004/0062278 A1* | 4/2004 | Hadzic et al. | 370/503 |
| 2005/0036512 A1* | 2/2005 | Loukianov | 370/469 |
| 2005/0039065 A1* | 2/2005 | Cheung et al. | 713/400 |
| 2005/0058149 A1 | 3/2005 | Howe | |
| 2005/0135429 A1 | 6/2005 | Bingham et al. | |
| 2006/0056432 A1* | 3/2006 | Azarov | 370/412 |
| 2006/0203851 A1 | 9/2006 | Eidson | |
| 2006/0256820 A1 | 11/2006 | Ilnicki et al. | |
| 2006/0280182 A1* | 12/2006 | Williams et al. | 370/394 |
| 2007/0147435 A1* | 6/2007 | Hamilton et al. | 370/503 |
| 2008/0089364 A1* | 4/2008 | Barry et al. | 370/517 |
| 2008/0181112 A1* | 7/2008 | Beck et al. | 370/235 |
| 2009/0053431 A1* | 2/2009 | Koenig | 428/32.3 |

OTHER PUBLICATIONS

Garner et al., (2010). International IEEE Symposium on Precision Clock Synchronization for Measurement, Control and communication. ISPCS 2010. Using an IEEE 802.1AS Network as a Distributed IEEE 1588 Boundary, Ordinary, or Transparent Clock. Sep. 27, 2010-Oct. 1, 2010. Portsmouth, New Hampshire.

Prof. Hans Weibel, Zurich University of Applied Sciences: Tutorial at the 2006 Conference on IEEE 1588; Oct. 2006.

International Search Report on corresponding PCT application (PCT/US2011/026894) from International Searching Authority (KR) dated Oct. 25, 2011.

Written Opinion on corresponding PCT application (PCT/US2011/026894) from International Searching Authority (KR) dated Oct. 25, 2011.

* cited by examiner

DISTRIBUTED PACKET-BASED TIMESTAMP ENGINE

CROSS REFERENCE TO RELATED APPLICATIONS

This application claims the benefit of U.S. Provisional Application No. 61/309,803, filed on Mar. 2, 2010 and titled "Distributed Packet-Based Timestamp Engine." the disclosure of which is incorporated herein by reference.

BACKGROUND OF THE INVENTION

The present invention relates generally to synchronization of clocks and, more particularly, to delay measurements and/or synchronization of clocks in a packet-switched communication network.

It may be advantageous in a networked system for devices in the network to have a common time base. The common time base may be used, for example, to trigger coordinated measurement instances in a network of sensors or to coordinate actions of controllers in an industrial system. In addition to sensors and controllers, the system may include computers and communication devices, such as routers.

The electronics industry has developed several standard protocols for use in synchronizing clocks, for example, the Network Time Protocol (NTP) and the Precision Time Protocol (PTP) of IEEE 1588. PTP includes sending timing-related messages between nodes in a communication network. The timing-related messages include, for example, a node transmitting a time-stamped packet to supply its time-base to another node and a node transmitting a packet requesting the receiving node to reply with the time of receipt. Any errors in handling the timing-related messages may be detrimental to accurate clock synchronization and the harm may be cumulative over multiple network devices. Furthermore, efficient handling of timing-related messages is beneficial so as to avoid interfering with other communication.

BRIEF SUMMARY OF THE INVENTION

One aspect of the invention provides a physical layer communication device, comprising: a local clock configured to supply time values; a receive block coupled to the local clock and configured to receive packets from a communication network and produce, depending on classifications of the received packets, timestamp values using time values from the local clock indicative of arrival times of the packets; and a transmit block coupled to the local clock and configured to transmit packets to the communication network and produce, depending on classifications of the transmitted packets, timestamp values using time values from the local clock indicative of transmittal times of the packets.

Another aspect of the invention provides a physical layer communication device, comprising: a receive local clock configured to supply time values; receiver circuitry configured to receive an input signal, produce received packets from the input signal, and supply a detection signal to the receive local clock when a timing reference point is detected in the input signal, wherein the time values supplied by the receive local clock are indicative of times when the detection signal is received by the receive local clock; a receive packet classifier coupled to the receiver circuitry and configured to assign one of a plurality of receive classifications to each of the received packets; a receive time calculator coupled to the receive packet classifier and the receive local clock and configured to produce receive timestamp values depending on the assigned receive classifications; and a receive packet writer coupled to the receive time calculator and configured to write, depending on the assigned receive classifications, the produced timestamp values into the received packets.

Another aspect of the invention provides a method for handling timing information in a communication device, the method comprising: receiving a packet from a communication link; classifying the packet to have a classification selected from a plurality of classification types; for at least one of the classification types, producing a timestamp value based on the time the packet is received by the communication device; for at least one of the classification types, writing the produced timestamp into the packet; and supplying the packet having the written timestamp to a higher-level device.

Another aspect of the invention provides a method for handling timing information in a communication device, the method comprising: receiving a packet from a higher-level device; classifying the packet to have a classification selected from a plurality of classification types; for at least one of the classification types, producing a timestamp value based on the time the packet is transmitted by the communication device; for at least one of the classification types, writing the produced timestamp into the packet; and transmitting the packet having the written timestamp to a communication network.

Another aspect of the invention provides a communication network node, comprising a local clock configured to supply time values; a first receive block coupled to the local clock and configured to receive packets from a first link in a communication network and produce, depending on classifications of the received packets, timestamp values using time values from the local clock indicative of arrival times of the packets; a first transmit block coupled to the local clock and configured to transmit packets to the first link in the communication network and produce, depending on classifications of the transmitted packets, timestamp values using time values from the local clock indicative of transmittal times of the packets; a second receive block coupled to the local clock and configured to receive packets from a second link in the communication network and produce, depending on classifications of the received packets, timestamp values using time values from the local clock indicative of arrival times of the packets; and a second transmit block coupled to the local clock and configured to transmit packets to the second link in the communication network and produce, depending on classifications of the transmitted packets, timestamp values using time values from the local clock indicative of transmittal times of the packets.

Another aspect of the invention provides a communication system, comprising: a plurality of line cards each comprising: a physical layer device comprising: a receive block configured to receive packets from a communication network and produce, depending on classifications of the received packets, timestamp values using time values indicative of arrival times of the packets; and a transmit block configured to transmit packets to the communication network and produce, depending on classifications of the transmitted packets, timestamp values using time values indicative of transmittal times of the packets; and a media access controller coupled to the physical layer device and configured to process the receive packets and the transmit packets according to a media access protocol; and a system card coupled to the plurality of line cards, the system card comprising: a switch fabric configured to couple the receive packets and the transmit packets between the plurality of line cards; and a physical layer device configured to provide timestamp processing associated with times the receive packets and the transmit packets are received by and transmitted from the system card.

These and other aspects of the invention are more fully comprehended upon review of this disclosure.

DETAILED DESCRIPTION

Figure 1:
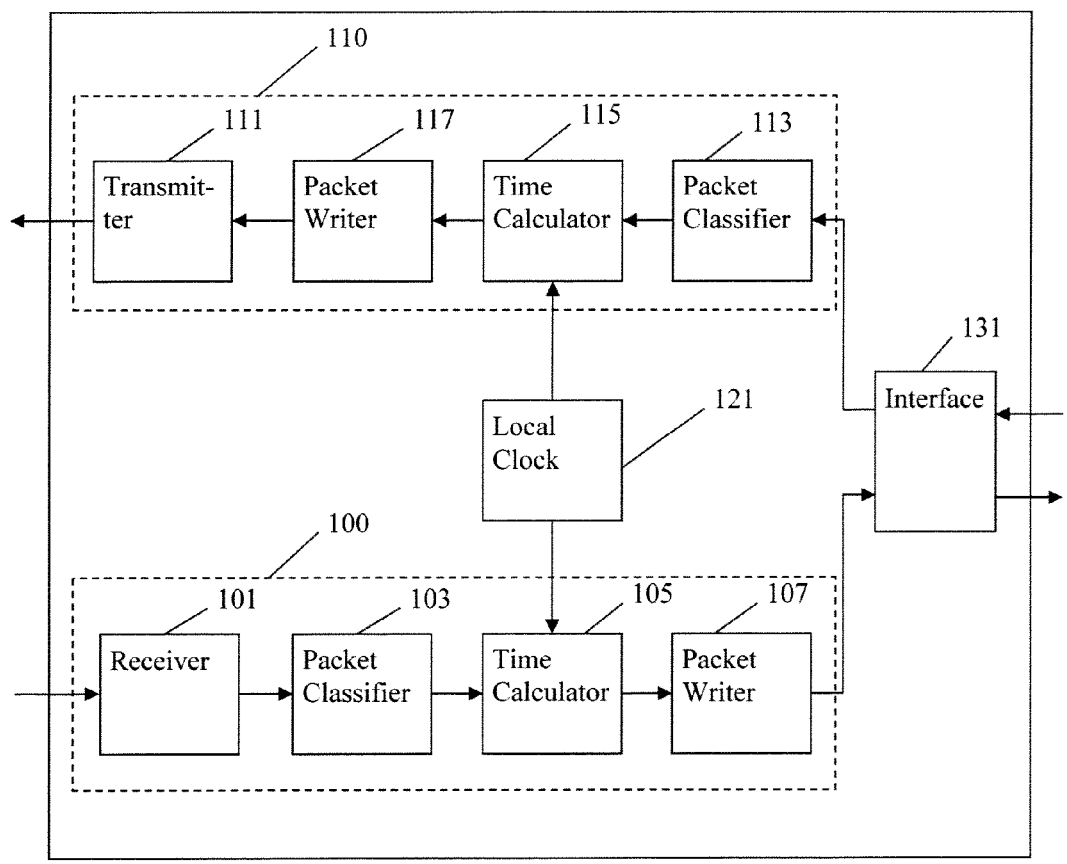
FIG. 1 is a block diagram of physical layer communication device in accordance with aspects of the invention.

FIG. 1 is a block diagram of a physical layer communication device (PHY) in accordance with aspects of the invention. The PHY includes a receive block 100 to receive an input signal from a communication network and a transmit block 110 to transmit an output signal to the communication network. A local clock 121 is included in the PHY to provide a timebase for the PHY and supply local time values to the receive block and the transmit block. The PHY also includes an interface block 131 for coupling to higher-level devices, although in some embodiments various other processing and/or formatting blocks may also be included in the signal path between the receive block and the interface block and the transmit block and the interface block. The blocks of the PHY are generally implemented with electronic circuitry. For example, in one embodiment the PHY is provided in one CMOS integrated circuit. Software programming may be used to control operation of some circuitry in the PHY. In one embodiment, a programmable processor is used to configure the circuitry of the PHY and to handle exception conditions.

The local clock 121 generally provides time values that are synchronized to another clock in the communication network. In one embodiment, the local clock is a master clock for the communication network and is synchronized to a high accuracy clock such as the U.S. Naval Observatory. In some embodiments, the local clock 121 in the PHY receives an input clock signal and a time value that are supplied by a time module. The time module may in various embodiments determine the time of day through its own clock, a signal received by the PHY, or a combination of both. The input clock signal provides a reference frequency, for example, nominally 250 MHz, that is locked to the frequency of a master clock in the communication network. The time value is loaded into the local clock 121 to initialize or update the local time value.

The receive block 100 includes a receiver 101 that is coupled to a communication link, for example, a fiber optic cable or a twisted pair cable, in the communication network and the receiver receives the input signal. In many embodiments, the input signal is received according to a standard format, for example, a standard for Ethernet. In one embodiment, the receiver 101 includes amplifiers, signal equalizers, phase locked loops, and related circuitry. The receiver 101 processes the input signal to recover data from the input signal and, in various embodiments, produces a data packet. A packet may also be termed a frame depending, in part, on the format standard. In various embodiments, the receiver 101 also determines a start of a packet or frame, for example, by determining that a frame delimiter signal or frame synchronization signal has been received. The received data packet may include a timestamp.

The receive packet classifier 103 classifies the packets according to what type of timestamp action is to be performed. It should be noted, however, that packet processing may commonly be considered a function for blocks at levels higher than a PHY. The PHY of FIG. 1 extends the packet processing in the PHY to provide for handling of timing synchronization information in packets.

In one embodiment, the packets are classified to be one of types A through E. Type A packets are packets that are not to receive timestamp processing in the receive block. Type B packets are packets that are to have the local time value (i.e., the time value from the local clock 121) written into the packet. Type C packets are packets that are to have the timestamp in the received packet modified by subtracting the local time value and adding an offset value, which in some embodiments may be zero. In some embodiments, however, the offset value may be an indication of a delay of the communication link on which the receiver receives data. Further, in some embodiments, the offset value instead or in addition may be an absolute value of an expected time of transversal of a start of the packet from time of entry into the receiver to either a time at which a start of the packet is determined by the receiver or a time at which the local time value is determined, which may generally both be the same time. In addition, in some embodiments the offset may have a negative value. Type D packets are packets that are to have the timestamp in the received packet modified by adding the local time value and adding the offset value. In some embodiments, type C packets are received by the receiver and type D packets are to be transmitted by a transmitter of the PHY, for example, as later discussed. Type E packets are packets that are to be saved along with the local time value. Type E packets may be subsequently processed, for example, by a network processor. In some embodiments, the receive packet classifier 103 classifies packets formatted according to multiple protocols, for example, Ethernet and multiprotocol label switching (MPLS) packets, and in some embodiments, the classification provided the packets may be based on one or both of a timestamp protocol for the packet (such as IEEE 1588 or some other protocol) and whether the packet is being received or transmitted. In some embodiments, packets are additionally classified using a flow, timing domain, virtual local area network (VLAN), or other identifier. Packets from the receive packet classifier 103 are supplied to a receive time calculator 105.

The receive time calculator 105 produces a new timestamp value depending on the classification of the packet. For many packet classifications, the receive time calculator 105 uses the local time value obtained from the local clock 121. In many embodiments, the local time value desired is the time when a specific part of the packet (for example, the end of an Ethernet start of frame delimiter (SFD)) arrives at the input to the receiver 101. Accordingly, in some embodiments, the local time value used by the time calculator 105 may be a value from the local clock 121 minus a delay value that compensates for delays between the input to the receiver 101 and the time at which the receive time calculator 105 receives a value from the local clock 121. In other embodiments, the local time value may be sampled by the receiver 101 and supplied to the receive time calculator 105 with the packet. In one embodiment, delay values may be calculated using, for example, a measured loopback delay.

The receive time calculator 105 uses the local time value to produces a timestamp value in a manner that depends on the classification of the packet. In an embodiment using the above classifications, for type B and E packets, the new timestamp value produced is the local time value. For type C and D packets, the timestamp value is read from the received packet for use in producing the new timestamp value. For type C and D packets, the receive time calculator 105 may use an offset value. The offset value may, for example, indicate a delay on the communication link connected to the receiver. The received timestamp value may be read from a defined location in the packet that varies with the communication format. For type C packets, the new timestamp value produced is the received timestamp value minus the local time value plus the offset value. For type D packets, the new timestamp value produced is the received timestamp value plus the local time value plus the offset value. For type A packets, the receive time calculator 105 does not produce a new timestamp value. The new timestamp value is supplied to a receive packet writer 107.

The receive packet writer 107 may write the new timestamp value from the receive time calculator 105 to a location in the packet. The location written may vary depending on the format of the packet. In many embodiments, the location written is the same location from which the received timestamp value was read. The location may be the location of an IEEE 1588 packet's correction field. Some embodiments include packet classifications where the new timestamp value is written into a location in a preamble of the packet, a reserved location in the packet, or appended to the end of the packet. In one embodiment, the receive packet writer 107 may additionally clear a field in the packet depending on the format of the packet. For example, a checksum field in a UDP packet may be cleared. The receive packet writer 107 additionally updates checksum-type values in the packet as appropriate for the format of the packet. For example, for an Ethernet format packet, the receive packet writer 107 updates the frame check sequence (FCS). The receive packet writer 107 may additionally check the FCS in the received packet. If the FCS is incorrect, the packet may be dropped or the updated FCS may be corrupted, for example, by inversion, to prevent further processing of the packet. In many embodiments, the blocks within the receive block 110 operate on a packet without storing the packet in a memory. For example, concurrent with the receive packet writer 107 writing a timestamp in a packet, the receiver 101 may be receiving a later portion of the packet.

The interface block 131 receives the modified packet from receive packet writer 107. The interface block 131 provides an interface to a higher-level component, such as a media access controller (MAC). A higher-level component that receives packets over the interface may perform further packet processing, for example, determining destinations for the packets. The interface to a higher-level component may be, in one embodiment, a gigabit media-independent interface (GMII). The interface block 131 transmits the modified packet over the interface. The interface is bidirectional and the interface block 131 receives packets for transmission over the interface. Packets received over the interface are supplied to the transmit block 110. In other embodiments, there are separate interface blocks for receive and transmit.

The transmit block 110 includes a transmit packet classifier 113 that receives packets to be transmitted from the PHY. The transmit packet classifier 113 operates in manner similar to or the same as the receive packet classifier 103. However, the classifications of packets may differ between transmit and receive blocks. In one embodiment, the transmit packet classifier 113 has two classification. Packets in a first classification are not to receive timestamp actions in the transmit block. Packets in a second classification are to have timestamps modified by adding the local time value to a timestamp in the received packet.

Classified packets are supplied to a transmit time calculator 115 that operates in manner similar to the receive time calculator 105. However, output timestamp values produced may depend on the transmit classification of the packet, which may differ from the receive classification of the packet. The local time value used by the transmit time calculator 115 may correspond to when a specific part of the packet is transmitted from the transmit block 110. Accordingly, in some embodiments, the local time value used by the transmit e calculator 115 may be the time value from the local clock 121 plus a delay value that compensates for delays between the time at which the transmit time calculator 115 receives the value from the local clock 121 and when a reference point in the packet will be transmitted. In other embodiments, the local time value may be sampled by a transmitter 111 and supplied to the transmit time calculator 115 with the packet processed over blocks in a pipelined manner. The output timestamp value produced is supplied to the transmit packet writer 117.

The transmit packet writer 117 may write the output timestamp value from the transmit time calculator 115 to a location in the packet. The transmit packet writer 117 may be similar to or the same as the receive packet writer 107.

The transmitter 111 is coupled to a communication link, for example, a fiber optic cable, in the communication network to transmit the output signal. In many embodiments, the output signal is transmitted according to the same standard format as used for the input signal to the receiver 101. The transmitter 111 processes the packet from transmit packet writer 117 to produce the output signal.

Figure 2:
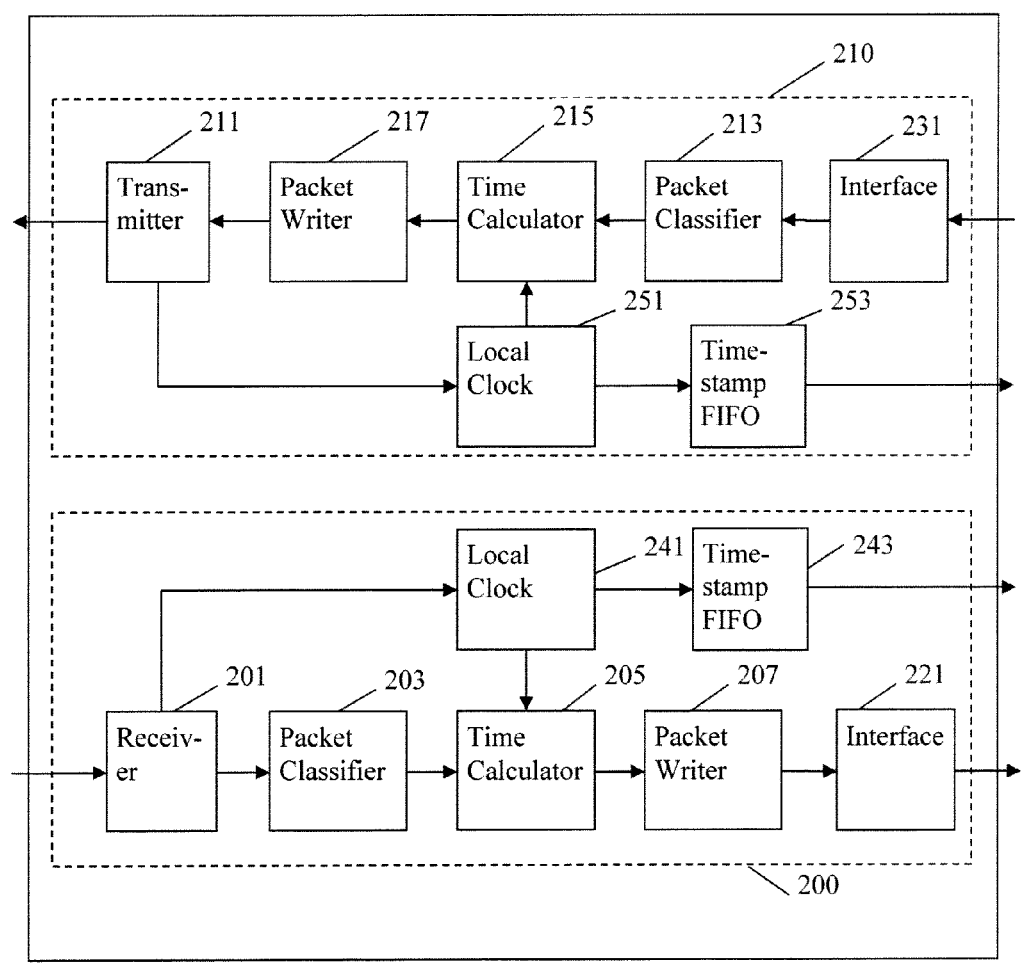
FIG. 2 is a block diagram of another physical layer communication device in accordance with aspects of the invention.

FIG. 2 is a block diagram of another embodiment of a physical layer communication device in accordance with aspects of the invention. The PHY includes a receive block 200 to receive an input signal from a communication network and a transmit block 210 to transmit an output signal to the communication network. The blocks of the PHY are generally implemented with electronic circuitry. For example, in one embodiment the PHY is provided in one CMOS integrated circuit. Software programming may be used to control operation of some circuitry in the PHY. In one embodiment, a programmable processor is used to configure the circuitry of the PHY and to handle exception conditions.

A receiver 201 is coupled to a communication link, for example a fiber optic cable or a twisted pair cable, in the communication network and the receiver receives the input signal and produces data packets. The receiver 201 is similar to or the same as the receiver 101 of FIG. 1. In some embodiments, the receiver 201 includes a clock and data recovery circuit. Data packets from the receiver are supplied to a receive packet classifier 203. Additionally, in the embodiment illustrated in FIG. 2, the receiver 201 produces a start of frame delimiter signal that signals when a timing reference point is received. The start of frame delimiter signal may be used to trigger subsequent processing of the frame and to trigger saving a time value, for example, a time value indicative of local time upon occurrence of receipt of the timing reference point, which may be adjusted as previously discussed.

A receive local clock 241 is included in the receive block 200 to supply local time values for use in processing received packets or for other uses of the time of receipt of a packet. The receive local clock 241 generally provides time values that are synchronized to another clock in the communication network. In the embodiment illustrated in FIG. 2, the local clock receives the start of frame delimiter signal from the receiver 201. A reading of the current value of the local clock is triggered by the start of frame delimiter signal. This provides an accurate time reading since the timing of reading the clock can be well controlled relative to the start of frame delimiter, which is a standardized reference point for clock synchronization. In some embodiments, the local time value from the receive local clock 241 is adjusted by subtracting a delay value that compensates for delays between the input to the receiver 201 and the time at which the receive local clock 241 is read. In one embodiment, delay values may be calculated using, for example, a measured loopback delay.

The receive local time values may be used in the receive block for subsequent processing of the associated packet. In some embodiments as shown in FIG. 2, the receive local time values may be written to a timestamp FIFO 243. The timestamp FIFO may then be read by, for example, a network processor for uses not resident in the PHY.

The receive packet classifier 203 classifies the packets according to what type of timestamp action is to be performed. The receive packet classifier 203 is the same as or similar to the receive packet classifier 103 of FIG. 1. Packets from the receive packet classifier 203 are supplied to a receive time calculator 205.

The receive time calculator 205 produces a new timestamp value depending on the classification of the packet. For many packet classifications, the receive time calculator 205 uses the local time value obtained from the local clock 221. In many embodiments, the receive time calculator 205 is the same as or similar to the receive time calculator 105 of FIG. 1. The new timestamp value is supplied to a receive packet writer 207.

The receive packet writer 207 generally writes the new timestamp value from the receive time calculator 205 to a location in the packet to produce a modified packet. In many embodiments, the receive packet writer 207 is the same as or similar to the receive packet writer 107 of FIG. 1. The modified packets are supplied to a receive interface block 221.

The receive interface block 221 provides an interface to a higher-level component, such as a media access controller (MAC). A higher-level component that receives packets over the interface may perform further packet processing, for example, determining destinations for the packets. The interface to a higher-level component may be, in one embodiment, a gigabit media-independent interface (GMII). The receive interface block 221 transmits the modified packet over the interface.

The receive block 200 generally operates using clock signals from multiple clock domains. In many embodiments, the receiver 201 operates using a line-rate clock recovered from the received signal and the receive interface block 221 operates using a system clock supplied over the interface. The receive local clock 241 may operate using the line-rate clock, the system clock, or a time-keeping clock that may be frequency locked to a master clock in the communication network. Shallow FIFOs are commonly used to buffer signals that transition between clock domains. In one embodiment, all blocks of the receive block 200 except the receiver 201 operate using the system clock. Accordingly, a FIFO buffers signals output from the receiver 201. In another embodiment, all blocks of the receive block 200 except the receive interface block 221 operate using the line-rate clock. Accordingly, a FIFO buffers signals received by the receive interface block 221. In other embodiments with different clock domains. FIFOs are placed at the corresponding clock domain boundaries.

The transmit block 210 includes blocks to perform operations on transmit packets that generally correspond to operations performed in the receive block 200. A transmit interface block 231 is analogous to the receive interface block 221 and receives packets to be transmitted from the PHY. In other embodiments, transmit interface block 231 and the receive interface block 221 are in a combined interface block.

A transmit packet classifier 213 receives packets from the transmit interface block 231. The transmit packet classifier 213 operates in manner similar to or the same as the transmit packet classifier 113 of FIG. 1.

Classified packets are supplied to a transmit time calculator 215 that operates in a manner similar to the receive time calculator 205. However, output timestamp values produced will depend on the transmit classification of the packet, which may use a different classification of packets than used in the receive block 100. The transmit time calculator 215 uses a local time value from a transmit local clock 251. The local time value used by the transmit time calculator 215 may correspond to when a specific part of the packet is transmitted from the transmit block 210. The output timestamp value produced is supplied to a transmit packet writer 217.

The transmit packet writer 217 may write the output timestamp value from the transmit time calculator 215 to a location in the packet. The transmit packet writer 217 may be similar to or the same as the receive packet writer 207.

The transmitter 211 is coupled to a communication link, for example, a fiber optic cable, in the communication network to transmit the output signal. In many embodiments, the output signal is transmitted according to the same standard format as used for the input signal to the receiver 201. The transmitter 211 processes the packet from transmit packet writer 217 to produce the output signal. In some embodiments, the transmitter 211 includes a serializer. Additionally, in the embodiment illustrated in FIG. 2, the transmitter 211 supplies a start of frame delimiter signal. The start of frame delimiter signal may be used to trigger saving a time value.

A transmit local clock 251 is included in the transmit block 210 to supply local time values for use in transmitted packets or for others uses that use the time of transmission of a packet. The transmit local clock 251 is similar to or the same as the receive local clock 241. In the embodiment illustrated in FIG. 2, the local clock receives the start of frame delimiter signal from the transmitter 211. A reading of the current value of the local clock is triggered by the start of frame delimiter signal. This provides an accurate time reading since the timing of reading the clock can be well controlled relative to the start of frame delimiter, which is a standardized reference point for clock synchronization. In some embodiments, the local time value from the transmit local clock 251 is adjusted by adding a delay value that compensates for delays between the time at which the transmit local clock 251 is read and the time at which a time reference point exits the transmitter 211.

The transmit local time values may be used in the transmit block for subsequent processing of the associated packet. In some embodiments as shown in FIG. 2, the local time values may be written to a timestamp FIFO 253. The timestamp FIFO 253 may then be read by, for example, a network processor for uses not resident in the PHY.

In many embodiments, the blocks within the transmit block 110 operate on a packet without storing the packet in a memory. For example, concurrent with the transmit packet writer 117 writing a timestamp in a packet, the transmitter 111 may be transmitting an earlier portion of the packet.

The transmit block 210 may include multiple clock domains in a manner similar to the receive block. However, in many embodiments, the transmit block 210 operates using one clock domain.

Figure 3:
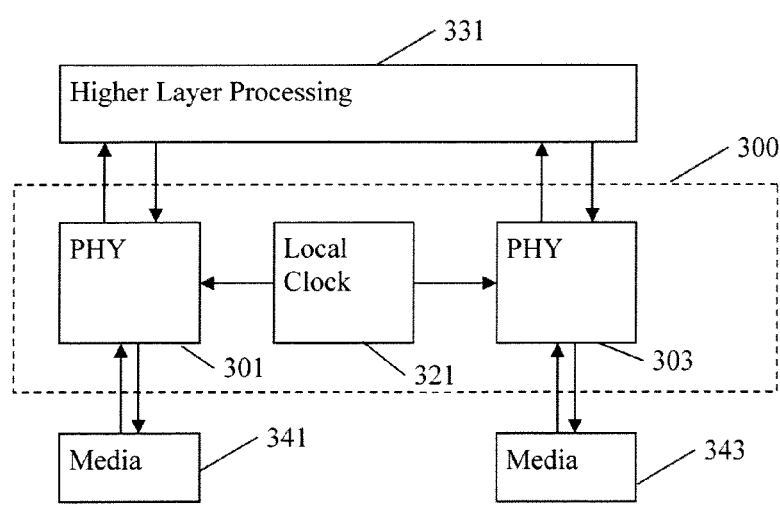
FIG. 3 is a block diagram of a communication network node in accordance with aspects of the invention.

FIG. 3 is a block diagram of a communication network node in accordance with aspects of the invention. The node includes a first PHY 301 and a second PHY 303 that transmit and receive signals from a first physical media link 341 and a second physical media link 343, respectively. Each PHY is additionally coupled to a higher-layer processing block 331. The node includes a local clock 321. Each PHY includes a transmit block and receive block, for example, as described with reference to FIGS. 1 and 2. The node may be provided as an integrated circuit. The PHYs handle timestamp processing and may be used to add clock synchronization to a network without substantial modification of other components.

Figure 4:
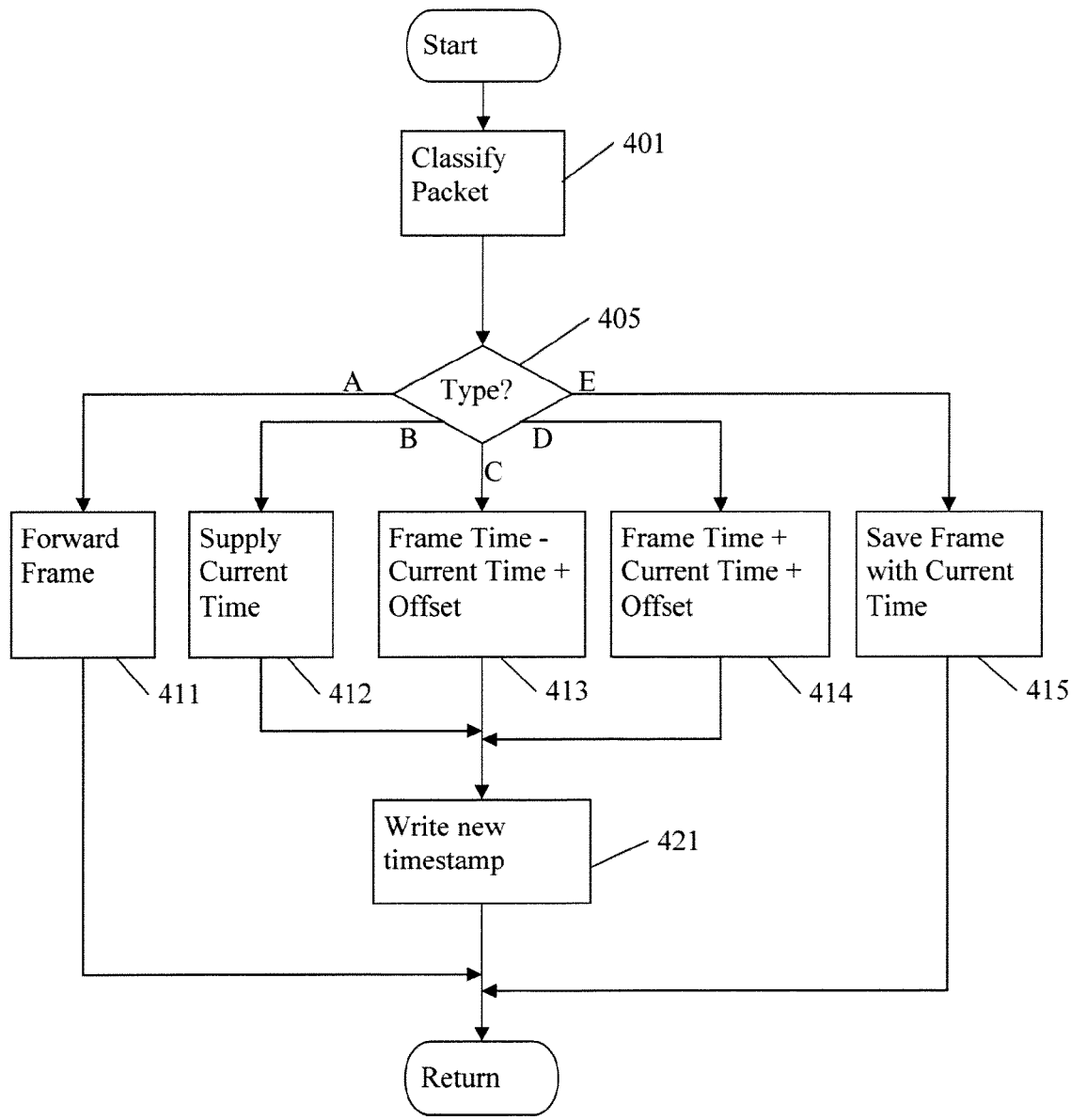
FIG. 4 is a flowchart of a process for handling timing information in accordance with aspects of the invention.

FIG. 4 is a flowchart of a process for handling timing information in accordance with aspects of the invention. The process may be implemented by a PHY device, for example, the device of FIG. 1. The process embodiment illustrated in FIG. 4 corresponds to processing performed by the receive block 100 of FIG. 1. Other embodiments are essentially similar but may have, for example, a different number of packet classifications.

In block 401, the process classifies a packet received as an input to the process. The classification is according to the type of timestamp processing to be performed by the process. Packets may additionally be classified according to the communication format used, the timestamp protocol used, the type of operation being performed with respect to the packet, or a combination thereof. For example, in some embodiments, a received packet for an IEEE 1588 timestamp protocol may be classified as a type C packet and packet to be transmitted for an IEEE 1588 protocol may be classified as a type D packet.

In block 405, the process tests the type of packet classified in block 401. If the classification is type A, the process continues to block 411. If the classification is type B, the process continues to block 412. If the classification is type C, the process continues to block 413. If the classification is type D, the process continues to block 414. If the classification is type E, the process continues to block 415. In an embodiment with a different classification scheme, correspondingly different branches would be taken in block 405.

In block 411, the process forwards the packet through for subsequent processing. Type A packets are a classification that do not receive timestamp processing. The process thereafter returns.

In block 412, the process supplies a new timestamp with a value from a local clock. The value may be adjusted to compensate for delays in processing. The process then continues to block 421.

In block 413, the process supplies a new timestamp using a timestamp value from the received packet, a value from a local clock, and an offset value. The new timestamp has a value that is the value from the received packet minus the value from the local clock plus the offset value. The value from the local clock may be adjusted to compensate for delays in processing. The offset value may correspond to a delay over a link supplying the packet to the process. The process then continues to block 421.

In block 414, the process supplies a new timestamp in manner similar to block 413. However, the new timestamp has a value that is the value from the received packet plus the value from the local clock plus the offset value. The process then continues to block 421.

In block 415, the process supplies a new timestamp with a value from a local clock. The value may be adjusted to compensate for delays in processing. The packet, or an identifier of the packet, and the new timestamp value are saved for subsequent processing, and in many embodiments the packet is forwarded through for subsequent processing. For example, a higher-layer device may use the packet and the new timestamp value to process a packet with a message signaling timing information for a boundary clock. In contrast, packets processed in block 411-414 may also be forwarded to higher-layer device, for example, for routing. However, in many embodiments generally the higher-layer device does not perform further processing of timing information. The process thereafter returns.

In block 421, the process writes the new timestamp value into the packet. The value may be written to a fixed location in the packet with the location defined by the format of the packet. In some embodiments, the process also writes a checksum-type value in the packet. For example, for an Ethernet format packet, the process may update the frame check sequence (FCS) to reflect the new timestamp value. The process thereafter returns.

The process illustrated in FIG. 4 may be performed twice within a network device for a given packet, upon ingress of the packet and upon egress of the packet. The classification of the packet may differ between ingress and egress with a corresponding different branch taken from decision block 405. For example, when the network device is providing IEEE 1588 end-to-end transparent clocks, the ingress process may perform block 513 and the egress process may perform block 514 with an offset value of zero in both. Thus, the ingress process produces a timestamp value with the value of the local clock, the receipt time, subtracted from the timestamp in the received frame. The egress process produces a timestamp value with the value of the local clock, the transmit time, added to the timestamp produced by the ingress process. Since the residence time in the network device is the transmit time minus the receipt time, the combined processes produce a timestamp value that is the timestamp in the received frame plus the residence time in the network device. The ingress and egress processes may be performed by an ingress PHY and an egress PHY in the network device and provide processing of the timing information without a involvement of a higher-level device, although a higher-level device will generally be used to route packets between the ingress and egress PHYs. This example may be termed one-step operation since the time values are included in the packets to which they relate.

A further example of use of the process illustrated in FIG. 4 is for transmission of an IEEE 1588 Sync message from a network device providing a master clock. The network device, for example, in a processor, creates information of a first packet containing a Sync message. The first packet is acted upon by an embodiment of the process, with the process for example performed by a PHY. The first packet is classified as type E so that block 415 is performed. In block 415 the process saves an identifier of the packet along with time of transmission of the packet. The processor reads the saved information and creates a second packet containing a Followup message. The Followup message includes the time of transmission of the first packet, which included the Sync message. The second packet is supplied to a second embodiment of the process. The second packet is classified as type A so that block 411 is performed. In block 411 the process forwards the packet for transmission without timestamp processing. This example may be termed two-step operation since the time value that relates to one packet is transmitted in second packet.

A further example of use of the process illustrated in FIG. 4 is for delay measurements according to ITU-T Y.1731. The measurements may be one-way delay measurements or two-way delay measurements. For a one-way delay measurement, a first network device sends a delay measurement packet containing a timestamp indicating transmission time to a second network device. The second network device measures the delay using the time it receives the packet and the transmit timestamp. Accordingly, the process may be performed twice, for the transmission time and for the reception time, for a one-way delay measurement.

An implementation of the process by a PHY device in the first network device classifies a delay measurement packet as type B. Thus, the process, in block 412, supplies a timestamp indicating the transmission time of the packet and, in block 421, writes the transmit timestamp into the packet at a first reserved location before or while the packet is transmitted to the second network device. When the packet is received by the second network device, an implementation of the process by a PHY device in the second network device also classifies the packet as type B. Thus, the process, in block 412, supplies a timestamp indicating arrival time of the packet and, in block 421, writes the receive timestamp into the packet at a second reserved location. The packet, which contains the transmission time and arrival time, may then be supplied to a processor in the second network device to calculate the delay.

For a two-way delay measurement, a first network device sends a delay measurement request packet containing a timestamp indicating transmission time to a second network device. The second network device responds by sending a reply packet to the first network device. The reply packet has a reception timestamp (indicating when the request packet is received by the second network device) and a transmission timestamp (indicating when the reply packet is transmitted by the second network device) inserted. The first network device measures the two-way delay using the time it receives the reply packet and the other timestamps in the reply packet. Accordingly, the process of FIG. 4 may be performed four times, once for each of the transmission and reception times, for a two-way delay measurement. Note that unlike one-way delay measurements, where the two network devices are synchronized to a common time base, two-way delay measurements may be performed when the two network devices lack a common time base.

An implementation of the process by a PHY device in the first network device classifies the request packet as type B. Thus, the process, in block 412, supplies a timestamp indicating transmission time of the request packet and, in block 421, writes the transmit timestamp into the request packet at a first reserved location before or while the packet is transmitted to the second network device. When the packet is received by the second network device, an implementation of the process by a PHY device in the second network device classifies the packet as type B. Thus, the process, in block 412, supplies a timestamp indicating arrival time of the packet and, in block 421, writes the receive timestamp into the packet at a second reserved location. The packet, which contains the transmission time and reception time, may then be supplied to a processor in the second network device to form the reply packet, for example, including swapping source and destination address in the request packet and setting an opcode to signal a reply.

Another implementation of the process by the PHY device in the second network device classifies the reply packet as type B. Thus, the process, in block 412, supplies a timestamp indicating transmission time of the reply packet and, in block 421, writes the transmit timestamp into the reply packet at a third reserved location before or while the packet is transmitted to the first network device. When the reply packet is received by the first network device, another implementation of the process by the PHY device in the first network device classifies the reply packet as type B. Thus, the process, in block 412, supplies a timestamp indicating arrival time of the reply packet and, in block 421, writes the receive timestamp into the reply packet at a fourth reserved location. The reply packet, which contains the transmission time and reception time of the request and the transmission time and reception time of the reply, may then be supplied to a processor in the first network device to calculate the delay.

The processes, in the above delay measurement examples, classify each of the packets as type B. However, the location at which the reception or transmission time value is written in the packets differs in each case depending on the type of delay measurement and whether the process was performing for a packet transmission or reception.

Figure 5:
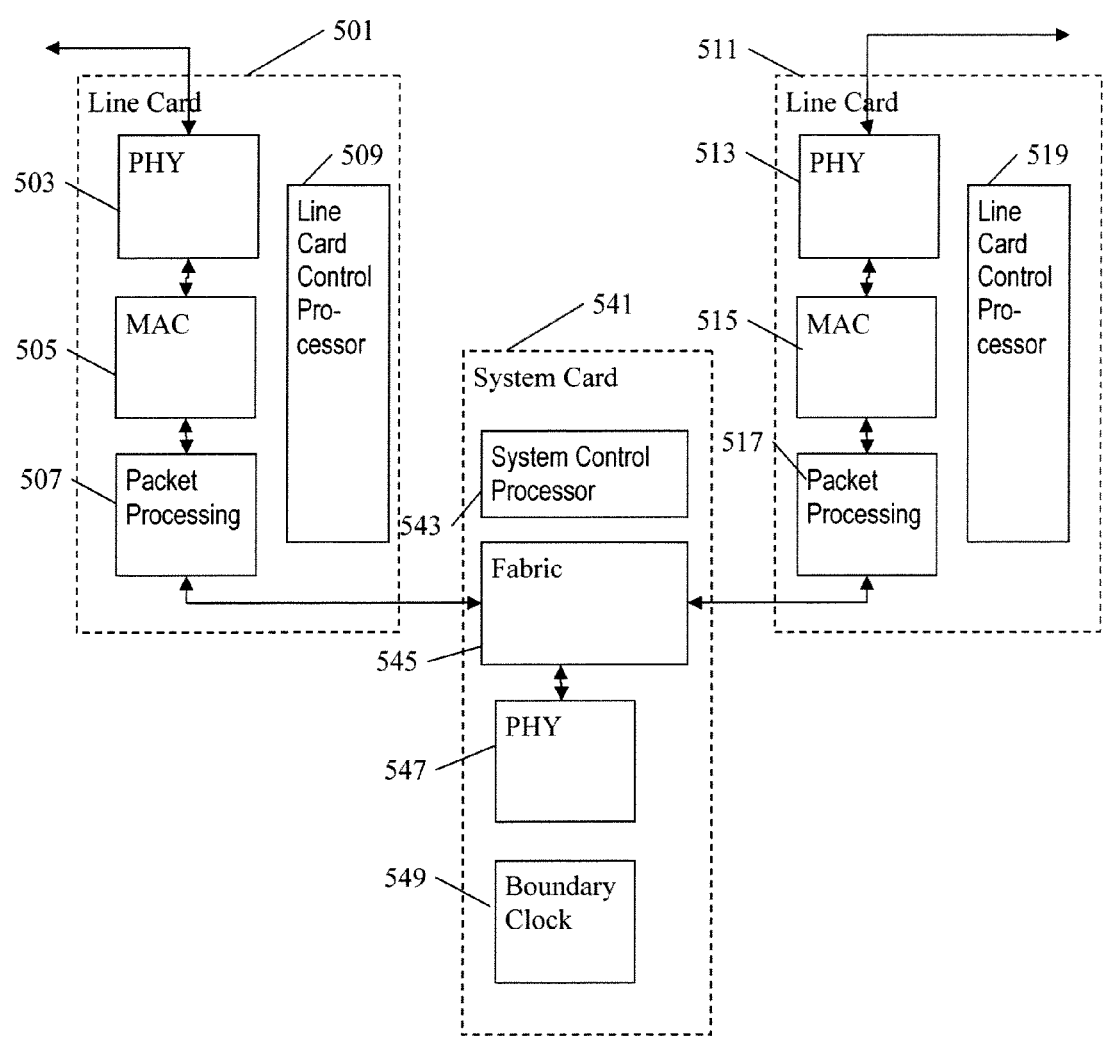
FIG. 5 is a block diagram of a communication system in accordance with aspects of the invention.

FIG. 5 is a block diagram of a communication system in accordance with aspects of the invention. The communication system handles timing information, for example, according to IEEE 1588 and ITU-T Y.1731. The system includes a first line card 501 and a second line card 511. The first line card includes a PHY 503 that provides timestamp processing. The PHY may be one of the PHYs described with reference to FIGS. 1 and 2. The PHY is coupled to a MAC 505 which is coupled to a packet processing module 507. Operation of the first line card is controlled and monitored by a line card control processor 509. The second line card 511 includes corresponding blocks and in some embodiments is the same as the first line card. FIG. 5 shows two line cards but a system may include many more line cards.

A system card 541 is coupled to the first and second line cards. A switch fabric 545 couples the line cards and switches packets between line cards. A system control processor 543 controls and monitors operation of the system card.

The system card includes a PHY 547. The PHY provide timestamp processing and may be one of the PHYs described with reference to FIGS. 1 and 2. In some embodiments, the system cards include a boundary clock 549. The boundary clock provides a clock local to the system card that is synchronized to a master clock in the communication network. The boundary clock serves as a master clock to other devices. Although an embodiment of the system without a boundary clock may not serve as a master clock to other devices, it may handle timing information, for example, processing packets for transparent clock according to IEEE 1588. Time values from the boundary clock are provided to the switch fabric by way of the PHY 547.

In some embodiments, a component of the system card, for example, the system control processor, provides to the PHY a signal indicative of receipt and transmission of a packet by components of the system card with the PHY performing timestamp operations based on the signals. In other embodiments, the PHY may be used to couple signals into and out of the system card, and thereby be able to provide timestamp related processing including determining time of receipt, time of transmission, and residence time of packets processed by the system card.

Although the invention has been discussed with respect to various embodiments, it should be recognized that the invention comprises the novel and non-obvious claims supported by this disclosure.

What is claimed is:

1. A physical layer communication device, comprising:
    a local clock configured to supply time values;
        a receive block coupled to the local clock and configured to receive packets from a communication network and produce, depending on classifications of the received packets, timestamp values using time values from the local clock indicative of arrival times of the packets, further comprising;

a receive packet classifier configured to assign one of a plurality of classifications to each of the received packets;

a receive time calculator coupled to the receive packet classifier and the local clock and configured to produce the timestamp values depending on the assigned classifications; and a receive packet writer coupled to the receive time calculator and configured to write, depending on the assigned classifications, the produced timestamp values into the received packets; and a transmit block coupled to the local clock and configured to transmit packets to the communication network and produce, depending on classifications of the transmitted packets, timestamp values using time values from the local clock indicative of transmittal times of the packets;

wherein the plurality of classifications includes a third classification, and wherein the receive time calculator is configured to extract received timestamp values from the received packets and configured to produce, for received packets assigned the third classification, timestamp values equal to the extracted timestamp values plus time values from the local clock indicative of arrival times of the packets plus an offset.

2. The physical layer communication device of claim 1, wherein the receive block comprises:

a receive packet classifier configured to assign one of a plurality of classifications to each of the received packets;

a receive time calculator coupled to the receive packet classifier and the local clock and configured to produce the timestamp values depending on the assigned classifications; and a receive packet writer coupled to the receive time calculator and configured to write, depending on the assigned classifications, the produced timestamp values into the received packets.

3. The physical layer communication device of claim 2, wherein the plurality of classifications includes a first classification, and wherein the receive time calculator is configured to produce, for received packets assigned the first classification, timestamp values equal to time values from the local clock indicative of arrival times of the packets.

4. The physical layer communication device of claim 2, wherein the plurality of classifications includes a second classification, and wherein the receive time calculator is configured to extract received timestamp values from the received packets and configured to produce, for received packets assigned the second classification, timestamp values equal to the extracted timestamp values minus time values from the local clock indicative of arrival times of the packets plus an offset.

5. The physical layer communication device of claim 1, wherein the plurality of classifications includes first and second classifications, and wherein the receive time calculator is configured to extract received timestamp values from the received packets and configured to produce, for received packets assigned the first classification, timestamp values equal to time values from the local clock indicative of arrival times of the packets; and configured to produce, for received packets assigned the second classification, timestamp values equal to the extracted timestamp values minus time values from the local clock indicative of arrival times of the packets plus an offset.

6. The physical layer communication device of claim 5, wherein the receive packet writer is configured to write the produced timestamp values into the received packets for received packets assigned the first, second, or third classification.

7. The physical layer communication device of claim 1, wherein the transmit block comprises:

a transmit packet classifier configured to assign one of a plurality of classifications to each of the transmitted packets;

a transmit time calculator coupled to the transmit packet classifier and the local clock and configured to produce the timestamp values depending on the assigned classifications; and a transmit packet writer coupled to the transmit time calculator and configured to write, depending on the assigned classifications, the produced timestamp values into the transmitted packets.

8. The physical layer communication device of claim 7, wherein the plurality of classifications includes a first classification, and wherein the transmit time calculator is configured to produce, for transmitted packets assigned the first classification, timestamp values equal to time values from the local clock indicative of transmittal time of the packets.

9. A physical layer communication device, comprising:

a local clock configured to supply time values;

a receive block coupled to the local clock and configured to receive packets from a communication network and produce, depending on classifications of the received packets, timestamp values using time values from the local clock indicative of arrival times of the packets, and to provide the packets to an interface coupled to the transmit block; and a transmit block coupled to the local clock and configured to transmit packets to the communication network and produce, depending on classifications of the transmitted packets, timestamp values using time values from the local clock indicative of transmittal times of the packets, comprising:

a transmit packet classifier configured to assign one of a plurality of classifications to each of the transmitted packets;

a transmit time calculator coupled to the transmit packet classifier and the local clock and configured to produce the timestamp values depending on the assigned classifications; and a transmit packet writer coupled to the transmit time calculator and configured to write, depending on the assigned classifications, the produced timestamp values into the transmitted packets;

wherein the plurality of classifications includes a second classification, and wherein the transmit time calculator is configured to extract transmit timestamp values from the transmitted packets and configured to produce, for transmitted packets assigned the second classification, timestamp values equal to the extracted timestamp values plus time values from the local clock indicative of transmittal time of the packets plus an offset.

10. A physical layer communication device, comprising:

a local clock configured to supply time values;

a receive block coupled to the local clock and configured to receive packets from a communication network and produce, depending on classifications of the received packets, timestamp values using time values from the local clock indicative of arrival times of the packets, and to provide the packets to an interface coupled to the transmit block; and a transmit block coupled to the local clock and configured to transmit packets to the communication network and produce, depending on classifications of the transmitted packets, timestamp values using time values from the local clock indicative of transmittal times of the packets, comprising:
- a transmit packet classifier configured to assign one of a plurality of classifications to each of the transmitted packets;
- a transmit time calculator coupled to the transmit packet classifier and the local clock and configured to produce the timestamp values depending on the assigned classifications; and
- a transmit packet writer coupled to the transmit time calculator and configured to write, depending on the assigned classifications, the produced timestamp values into the transmitted packets;
- wherein the plurality of classifications includes a third classification, and wherein the transmit time calculator is configured to extract transmit timestamp values from the transmitted packets and configured to produce, for transmitted packets assigned the third classification, timestamp values equal to the extracted timestamp values minus time values from the local clock indicative of transmittal time of the packets plus an offset.

11. The physical layer communication device of claim 10, wherein the plurality of classifications includes first, and second classifications, and wherein the transmit time calculator is configured to extract transmit timestamp values from the transmitted packets and configured to produce, for transmitted packets assigned the first classification, timestamp values equal to time values from the local clock indicative of transmittal time of the packets; and configured to produce, for transmitted packets assigned the second classification, timestamp values equal to the extracted timestamp values plus time values from the local clock indicative of transmittal time of the packets plus an offset.

12. The physical layer communication device of claim 11, wherein the trans packet writer is configured to write the produced timestamp values into the transmitted packets for transmitted packets assigned the first, second, or third classification.

13. A physical layer communication device, comprising:
- a receive local clock configured to supply time values;
- receiver circuitry configured to receive an input signal, produce received packets from the input signal, and supply a detection signal to the receive local clock when a timing reference point is detected in the input signal, wherein the time values supplied by the receive local clock are indicative of times when the detection signal is received by the receive local clock;
- a receive packet classifier coupled to the receiver circuitry and configured to assign one of a plurality of receive classifications to each of the received packets;
- a receive time calculator coupled to the receive packet classifier and the receive local clock and configured to produce receive timestamp values depending on the assigned receive classifications; and
- a receive packet writer coupled to the receive time calculator and configured to write, depending on the assigned receive classifications, the produced timestamp values into the received packets.

14. The physical layer communication device of claim 13, further comprising a receive FIFO coupled to receive local clock to receive the time values and supply the received time values and an indication of the associated packet to a higher-layer device.

15. The physical layer communication device of claim 13, further comprising:
- a transmit local clock configured to supply time values;
- a transmit packet classifier configured to accept transmit packets and assign one of a plurality of transmit classifications to each of the transmit packets;
- a transmit time calculator coupled to the transmit packet classifier and the transmit local clock and configured to produce transmit timestamp values depending on the assigned transmit classifications;
- a transmit packet writer coupled to the transmit time calculator and configured to write, depending on the assigned transmit classifications, the produced transmit timestamp values into the transmit packets; and
- transmit circuitry coupled to the transmit packet writer to receive the transmit packets and configured to transmit an output signal formed from the transmit packet and supply a detection signal to the transmit local clock when a timing reference point is transmitted in the output signal, wherein the time values supplied by the transmit local clock are indicative of times when the detection signal is received by the transmit local clock.

16. The physical layer communication device of claim 15, wherein the receive local clock is configured to operate in a time domain associated with the input signal and the transmit local clock is configured to operate in a time domain associated with the output signal.

17. A method for handling timing information in a communication device, the method comprising:
- receiving a packet from a communication link;
- classifying the packet to have a classification selected from a plurality of classification types;
- for at least one of the classification types, extracting a timestamp value from the packet and producing a timestamp value equaling the extracted timestamp value minus the time the packet was received by the communication device plus an offset; and
- for at least one of the classification types, writing the produced timestamp into the packet; and
- supplying the packet having the written timestamp to a higher-level device.

18. The method of claim 17, wherein classifying the packet comprises classifying the packet according to a timestamp protocol associated with the packet.

19. The method of claim 17, further comprising, for at least one classification type, extracting a timestamp value from the packet and wherein producing a timestamp value based on the time the packet is received by the communication device comprises producing a new timestamp value based on the extracted timestamp value and the time the packet is received by the communication device.

20. The method of claim 17, wherein the plurality of classification types includes a first type, a second type, and a third type, and wherein:
- for the first type and the second type, producing a timestamp value based on the time the packet is received by the communication device comprises producing a timestamp value equaling the time the packet was received by the communication device.

21. The method of claim 17, wherein writing the produced timestamp into the packet writes the produced timestamp at a location in the packet defined by a format of the packet.

22. A method for handling timing information in a communication device, the method comprising:
- receiving a packet from a higher-level device;
- classifying the packet to have a classification selected from a plurality of classification types;

for at least one of the classification types, producing a timestamp value based on the time the packet is transmitted by the communication device;

for at least one of the classification types, writing the produced timestamp into the packet;

transmitting the packet having the written timestamp to a communication network; and wherein the plurality of classification types includes a first type, a second type, and a third type, and wherein:

for the first type and the second type, producing a timestamp value based on the time the packet is transmitted by the communication device comprises producing a timestamp value equaling the time the packet is transmitted by the communication device;

for the third type, producing a timestamp value based on the time the packet is transmitted by the communication device comprises extracting a timestamp value from the packet and producing a timestamp value equaling the extracted timestamp value plus the time the packet is transmitted by the communication device plus an offset; and the at least one of the classification types for which the method writes the produced timestamp into the packet comprises the second type and the third type.

23. The method of claim 22, wherein classifying the packet comprises classifying the packet according to a timestamp protocol associated with the packet.

24. The method of claim 22, further comprising, for at least one classification type, extracting a timestamp value from the packet and wherein producing a timestamp value based on the time the packet is transmitted by the communication device comprises producing a new timestamp value based on the extracted timestamp value and the time the packet is transmitted by the communication device.

25. The method of claim 22, wherein writing the produced timestamp into the packet writes the produced timestamp at a location in the packet defined by a format of the packet.

26. A communication network node, comprising:

a local clock configured to supply time values;

a first receive block coupled to the local clock and configured to receive packets from a first link in a communication network and produce, depending on classifications of the received packets, timestamp values using time values from the local clock indicative of arrival times of the packets;

a first transmit block coupled to the local clock and configured to transmit packets to the first link in the communication network and produce, depending on classifications of the transmitted packets, timestamp values using time values from the local clock indicative of transmittal times of the packets;

a second receive block coupled to the local clock and configured to receive packets from a second link in the communication network and produce, depending on classifications of the received packets, timestamp values using time values from the local clock indicative of arrival times of the packets; and a second transmit block coupled to the local clock and configured to transmit packets to the second link in the communication network and produce, depending on classifications of the transmitted packets, timestamp values using time values from the local clock indicative of transmittal times of the packets.

27. A communication system, comprising:

a plurality of line cards each comprising:

a physical layer device comprising:

a receive block configured to receive packets from a communication network and produce, depending on classifications of the received packets, timestamp values using time values indicative of arrival times of the packets; and a transmit block configured to transmit packets to the communication network and produce, depending on classifications of the transmitted packets, timestamp values based on a residence time calculated as the difference between the arrival time and a transmit time; and a media access controller coupled to the physical layer device and configured to process the receive packets and the transmit packets according to a media access protocol; and a system card coupled to the plurality of line cards, the system card comprising:

a switch fabric configured to couple the receive packets and the transmit packets between the plurality of line cards; and a physical layer device configured to provide timestamp processing associated with times the receive packets and the transmit packets are received by and transmitted from the system card.

\* \* \* \* \*

UNITED STATES PATENT AND TRADEMARK OFFICE
CERTIFICATE OF CORRECTION

PATENT NO. : 8,571,014 B2
APPLICATION NO. : 13/039199
DATED : October 29, 2013
INVENTOR(S) : Thomas Kirkegaard Joergensen, Brian Branscomb and Kristian Ehlers It is certified that error appears in the above-identified patent and that said Letters Patent is hereby corrected as shown below:

In the Specification

In column 6, line 12, delete "e" and insert --time--, therefor.

In the Claims

In column 15, line 37, in Claim 12, delete "trans" and insert --transmit--, therefor.

Signed and Sealed this
Eighth Day of July, 2014

Michelle K. Lee
*Deputy Director of the United States Patent and Trademark Office*